(12) United States Patent
Bartlett et al.

(10) Patent No.: US 7,171,068 B2
(45) Date of Patent: Jan. 30, 2007

(54) METHOD TO IMPROVE AN EXTINCTION RATIO OF AN OPTICAL DEVICE

(75) Inventors: Terry Bartlett, Dallas, TX (US); Benjamin L. Lee, Duncanville, TX (US); Bryce D. Sawyers, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/326,231

(22) Filed: Dec. 20, 2002

(65) Prior Publication Data

US 2004/0120049 A1 Jun. 24, 2004

(51) Int. Cl.
*G02B 6/26* (2006.01)
*G02B 26/00* (2006.01)

(52) U.S. Cl. .............. 385/17; 385/18; 385/28; 385/37; 385/39; 385/40; 385/41; 385/47; 359/291; 359/298; 359/337.5; 359/338

(58) Field of Classification Search ........ 359/290–292, 359/627, 634, 295, 298, 223, 224, 337.5, 359/338–339; 385/45–48, 82, 85, 16–18, 385/28, 37, 39–41
See application file for complete search history.

(56) References Cited

U.S. PATENT DOCUMENTS 5,774,254 A * 6/1998 Berlin .................. 359/259
6,445,488 B1 * 9/2002 Lee ..................... 359/291
6,445,502 B1 * 9/2002 Islam et al. ............ 359/571
6,457,830 B1 * 10/2002 Choi .................... 353/33
6,522,453 B2 * 2/2003 Yoneyama .............. 359/290
6,654,516 B2 * 11/2003 So ...................... 385/27
6,747,783 B1 * 6/2004 Sandstrom ............. 359/290
6,767,100 B1 * 7/2004 Long et al. ............ 353/31
6,842,549 B2 * 1/2005 So ...................... 385/15
2002/0079432 A1 6/2002 Lee et al. ............... 250/216
2003/0202233 A1 * 10/2003 Sandstrom ............ 359/290

OTHER PUBLICATIONS

L. Yoder, et al., "DLP™ Technology: Applications in Optical Networking," Texas Instruments, Inc., white paper, 8 pages.

* cited by examiner

*Primary Examiner*—Evelyn A. Lester
(74) *Attorney, Agent, or Firm*—Charles A. Brill; Wade James Brady, III; Frederick J. Telecky, Jr.

(57) ABSTRACT

A method to improve an extinction ratio of an optical device, the method includes positioning at least a majority of a plurality of micro-mirrors in an off-state position. A mirror assembly includes the plurality of micro-mirrors. The method also includes selectively positioning at least one of the plurality of micro-mirrors in an on-state position. In one particular embodiment, the at least one of the plurality of micro-mirrors positioned in the on-state position operates to improve an extinction ratio of an optical device.

16 Claims, 2 Drawing Sheets

METHOD TO IMPROVE AN EXTINCTION RATIO OF AN OPTICAL DEVICE

TECHNICAL FIELD OF THE INVENTION

This invention relates in general to telecommunications systems, and more particularly to a method of improving an extinction ratio of an optical device.

Overview

Digital micro-mirror devices (DMD) used in optical communication systems are capable of equalizing, filtering, modulating, and controlling multiple wavelength optical signals as they propagate through an optical network. Conventional off-state micro-mirrors of DMD devices are typically limited in their ability to minimize diffracted light from coupling into an optical output fiber of the network. Failing to minimize the coupling of diffracted light from the DMD can decrease an extinction ratio of the optical device rendering the device unsuitable for use in some optical networking applications.

SUMMARY OF EXAMPLE EMBODIMENTS

In one embodiment, a method to improve an extinction ratio of an optical device comprises positioning at least a majority of a plurality of micro-mirrors in an off-state position. A mirror assembly comprises the plurality of micro-mirrors. The method also comprises selectively positioning at least one of the plurality of micro-mirrors in an on-state position. In one particular embodiment, the at least one of the plurality of micro-mirrors positioned in the on-state position operates to improve an extinction ratio-of an optical device.

In another embodiment, a method of communicating optical signals using a micro electro-mechanical switching (MEMS) device comprises receiving at least one optical signal wavelength at a mirror assembly comprising a plurality of micro-mirrors. At least a majority of the plurality of micro-mirrors are operating in an off-state position. The method also comprises selectively positioning at least one of the plurality of micro-mirrors in an on-state position. In one particular embodiment, the at least one of the plurality of micro-mirrors positioned in the on-state position operates to improve an extinction ratio of a MEMS device.

In yet another embodiment, a method of communicating optical signals using a micro electro-mechanical switching (MEMS) device comprises receiving at least one optical signal at a plurality of micro-mirrors operating in an on-state position. The method also comprises selectively positioning at least some of the plurality of micro-mirrors to an off-state position. In one particular embodiment, at least one of the plurality of micro-mirrors remains in the on-state position after the at least some of the plurality of micro-mirrors change to the off-state, position. The method further comprises reflecting a first light phase from the at least one of the plurality of micro-mirrors. The first light phase comprising a light phase that is substantially opposite a second light phase reflected from the at least some of the plurality of micro-mirrors.

Depending on the specific features implemented, particular embodiments of the present invention may exhibit some, none, or all of the following technical advantages. Various embodiments may be capable of generating a light phase capable of counteracting substantially all of a composite phase diffracted from the off-state micro-mirrors of an optical device (e.g., a coherent light modulator). Some embodiments may be capable of improving the extinction ratio of the optical device by at least two decibels.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
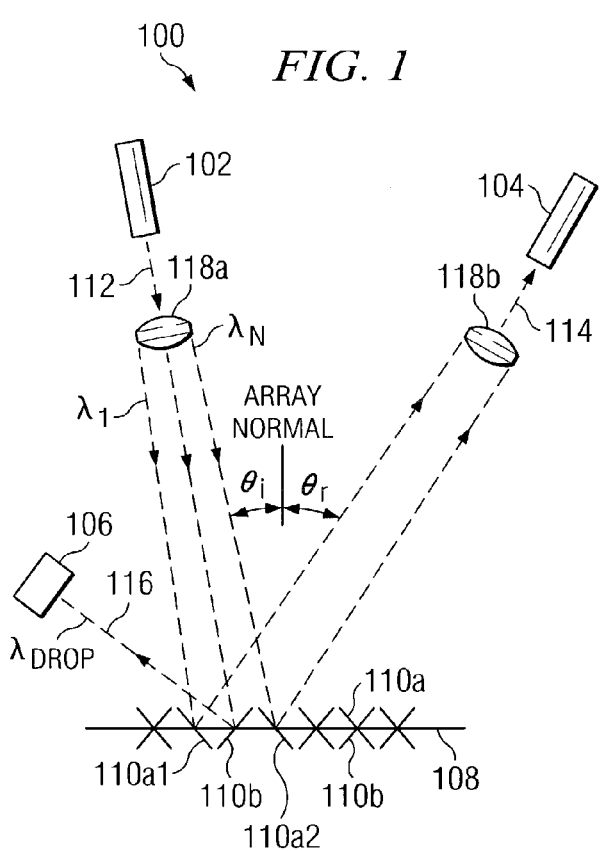
FIG. 1 is a block diagram of one example of an optical device implementing a coherent light modulator capable of improving an optical networking extinction ratio of the optical device.

FIG. 1 is a block diagram of one example of an optical device 100 implementing a coherent light modulator 108 capable of improving an optical networking extinction ratio of optical device 100. Optical device 100 may comprise an optical switch, an optical add/drop multiplexer, an optical filter, an equalizer, or any other optical device. As used in this document, the phrase "extinction ratio" refers to a measurement of the ratio of the output power in an on-state to the output power in an off-state of optical device 100.

In this example, optical device 100 includes an input optical fiber 102 capable of introducing a multiple wavelength signal 112 to device 100 and an output optical fiber 104 capable of removing at least a portion of signal 112 from device 100. Optical fibers 102 and 104 can comprise any fiber type, such as, for example, a single mode optical fiber or a dispersion-shifted fiber. Although this example implements a multiple wavelength optical signal 112, any number of optical signal wavelengths can be used without departing from the scope of the present disclosure. In various embodiments, multiple wavelength optical signal 112 can comprise one or more wavelengths within the 1480 nm to 1580 nm wavelength range.

Optical device 100 also includes at least a first optics group 118a and a second optics group 118b. Although this example implements two optics groups 118a and 118b, any other number of optics groups can be used without departing from the scope of the present disclosure. In this example, first optics group 118a operates to separate multiple wavelength signal 112 into discrete wavelength channels ($\lambda_1$–$\lambda_n$) and to focus the wavelength channels onto a coherent light modulator 108. Similarly, second optics group 118b operates to combine the reflected wavelength channels from modulator 108 into an output multiple wavelength optical signal 114 and to focus signal 114 into output optical fiber 104.

First and second optics groups may comprise a condenser lens and/or any other suitable optical device.

Optical device 100 also includes coherent light modulator 108 operable to selectively communicate one or more optical signal wavelengths from device 100. In some cases, coherent light modulator 108 can operate to dynamically manipulate and shape the wavelength channels of multiple wavelength optical signal 112. Coherent light modulator 108 may comprise any device capable of selectively communicating at least some of the wavelength channels of multiple wavelength optical signal 112 to output optical fiber 104 and/or to a drop port 106 within optical device 100.

In this particular embodiment, modulator 108 comprises a digital micro-mirror device (DMD). A DMD is a micro electro-mechanical switching (MEMS) device comprising an array of thousands of tilting micro-mirrors. The total integrated reflectivity of the micro-mirror array of modulator 108 is based at least in part on the area of the micro-mirror array, the angle of incidence ($\theta_i$), and the reflectivity of the mirror material at a specific wavelength. In some cases, by selecting an optimal micro-mirror pitch and tilt angle, modulator 108 can operate in a blazed or near-blazed condition. As used in this document, the term "blazed" or "near-blazed" refers to an operating condition where the Fraunhofer diffraction angle ($\theta_f$) approximately aligns with a diffractive order ($\theta_r$) of modulator 108 (e.g., $\theta_f = \theta_r$). A comprehensive discussion of a method of obtaining a blazed or near-blazed condition is set forth in U.S. patent application Ser. No. 09/923,911, filed Aug. 7, 2001 and entitled "TWO-DIMENSIONAL BLAZED MEMS GRATING," which is incorporated herein by reference.

In this example, modulator 108 includes a plurality of mirror assemblies each capable of operating in either an on-state condition 110a or an off-state condition 110b. Although on-state mirror assemblies 110a and off-state mirror assemblies 110b are depicted as a single mirror, each of mirror assembly comprises a plurality of micro-mirrors or pixels. As used in this document, the terms "micro-mirror" and "pixel" are used inter-changeably. In this example, each mirror assembly operates to selectively communicate one wavelength channel. For example, on-state mirror assembly $110a_1$ operates to selectively communicate wavelength channel $\lambda_1$. Typically, each wavelength channel received by mirror assemblies is spread over several micro-mirrors to enable mirror assemblies to control the amount of light that couples into output fiber 104. In various examples, mirror assemblies can comprise two or more pixels, twenty of more pixels, or even one hundred or more pixels.

Each micro-mirror or pixel is typically 13.8 square μm in size and has less than a 1 μm gap between adjacent micro-mirrors. In some cases, each micro-mirror or pixel contained within mirror assembly comprises approximately a 17 square μm micro-mirror. In addition, each micro-mirror of mirror assemblies may tilt up to plus or minus twelve (12) degrees creating the "on" state condition or the "off" state condition.

To permit the micro-mirrors to tilt, each micro-mirror is attached to one or more hinges mounted on support posts, and spaced by means of an air gap over underlying control circuitry. The control circuitry provides electrostatic forces capable of selectively switching the micro-mirrors between on-state and off-state. The electrostatic forces cause each micro-mirror to selectively tilt. The control circuitry can comprise any hardware, software, firmware, or combination thereof.

In operation, on-state mirror assemblies 110a operate to selectively reflect at least some of the wavelength channels of signal 112 to output fiber 104. In addition, on-state mirror assemblies 110a can vary the optical power of each wavelength channel coupled into output fiber 104 by selectively varying the operating state of some of the micro-mirrors or pixels of mirror assembly 110a.

In this particular embodiment, off-state mirror assembly 110b operates to selectively remove at least one wavelength channel $\lambda_{DROP}$ from signal 112 by reflecting wavelength channel $\lambda_{DROP}$ along off-state light path 116 for receipt by dump port 106. Although wavelength channel $\lambda_{DROP}$ is removed from optical device 100 in this example, any other wavelength channel ($\lambda_1$–$\lambda_n$) could be removed by any one of mirror assemblies without departing from the scope of the present disclosure. For example, the control circuitry of modulator 108 could operate to alter the operating state at least some of mirror assemblies. The altered operating states of mirror assemblies, for example, could allow the wavelength channel $\lambda_{DROP}$ to be reflected to output fiber 104 and wavelength channel $\lambda_1$, to be reflected to drop port 106.

In most cases, switching an on-state mirror assembly to an off-state condition redirects most of the selected wavelength channel along light path 116. However, diffraction effects complicate the implementation of modulator 108 in optical switching applications where it is desired to drop one or more wavelength channels from signal 112. This complication tends to result from inherent characteristics of mirror assembly 110b and causes at least some of wavelength channel $\lambda_{DROP}$ to couple into output fiber 104. This diffracted light tends to cause optical device 100 to generate an optical extinction ratio of approximately 34 dB, which in some optical applications is insufficient.

In this particular example, at least one off-state pixel from mirror assembly 110b is selectively switched to an on-state condition. Selectively switching at least one off-state pixel to an on-state condition advantageously improves the extinction ratio of device 100. The improved extinction ratio is based at least in part on the on-state pixel reflecting a light phase that is approximately opposite the composite light phase diffracted from the remaining off-state pixels. In other words, the on-state pixel reflects a light phase that substantially counteracts the effects of the composite light phase reflected from the off-state pixels, which results in the improved extinction ratio. In various embodiments, selectively switching at least one off-state pixel to an on-state condition can improve the extinction ratio of device 100 by two (2) dB, four (4) dB, or more.

Figure 2:
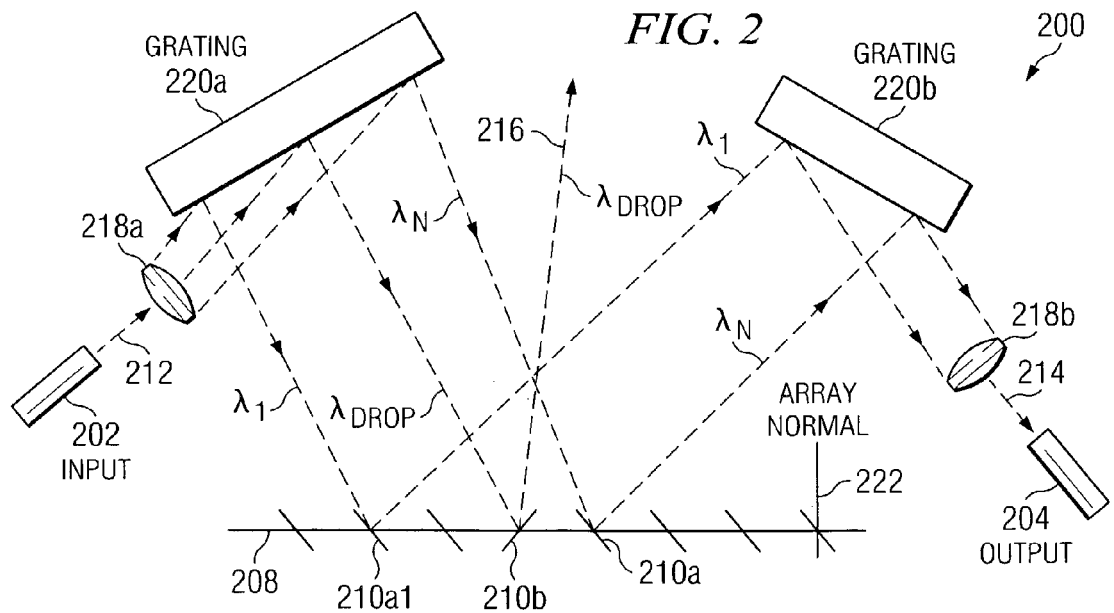
FIG. 2 is a block diagram of one example of an optical device implementing a coherent light modulator capable of improving an optical networking extinction ratio of the optical device.

FIG. 2 is a block diagram of one example of an optical device 200 implementing a coherent light modulator 208 capable of improving an optical extinction ratio of optical device 200. In this particular example, device 200 comprises an optical add/drop multiplexer (OADM) capable of adding and/or dropping any subset of wavelength channels from a multiple wavelength optical signal 212. In this example, optical device 200 includes an input optical fiber 202 capable of introducing signal 212 to device 200 and an output optical fiber 204 capable of removing at least some wavelengths of signal 212 from device 200. The structure and function of optical fibers 202 and 204 can be substantially similar to optical fibers 102 and 104 of FIG. 1.

Optical device 200 also includes at least a first optics group 218a and a second optics group 218b. Although this example implements two optics groups 218a and 218b, any other number of optics groups can be used without departing from the scope of the present disclosure. In this example, first optics group 218a operates to separate multiple wavelength signal 212 into discrete wavelength channels ($\lambda_1$–$\lambda_n$) and to focus the wavelength channels onto an input optical grating 220a. Similarly, second optics group 218b operates to combine the reflected wavelength channels from an output optical grating 220b into an output multiple wavelength optical signal 214 and to focus signal 214 into output optical fiber 204. The structure and function of first and second optics groups 218 can be substantially similar to optics groups 118 of FIG. 1. In this example, gratings 220a and 220b operate to reflect collimated optical signal wavelengths to and/or from a coherent light modulator 208. Gratings 220a and 220b can comprise any reflective device, such as, a dielectric grating.

Optical device 200 also includes coherent light modulator 208 operable to selectively communicate one or more optical signal wavelengths from device 200. The structure and function of coherent light modulator 208 can be substantially similar to coherent light modulator 108 of FIG. 1.

In this example, each mirror assembly 210 operates to selectively communicate one wavelength channel. For example, on-state mirror assembly $210a_1$ operates to selectively communicate wavelength channel $\lambda_1$. In this example, at least some of the wavelength channels of multiple wavelength optical signal 212 received by the mirror array of modulator 208 are reflected by on-state mirror assemblies 210a to grating 220b. In addition, off-state mirror assembly 210b reflects at least one wavelength channel $\lambda_{DROP}$ along off-state light path 216.

In operation, on-state mirror assemblies 210a operate to selectively transmit at least some of the wavelength channels of signal 212 to output fiber 204. In addition, on-state mirror assemblies 210a can vary the optical power of each wavelength channel coupled into output fiber 204 by selectively varying the operating state of some of the micro-mirrors or pixels of mirror assembly 210a. In this example, off-state mirror assembly 210b operates to selectively remove at least one wavelength channel $\lambda_{DROP}$ of optical signal 212 by reflecting wavelength channel $\lambda_{DROP}$ along off-state light path 216. Although this example depicts the selective removal of one wavelength channel $\lambda_{DROP}$ from signal 212, any additional number of wavelength channels or bands of channels can be removed without departing from the scope of the present disclosure.

In this particular example, a plurality of off-state pixels of mirror assembly 210b are selectively switched to an on-state condition. In various embodiments, the plurality of off-state mirrors selectively switched to the on-state condition can form a symmetric pattern of on-state pixels within mirror assembly 210b. Generating symmetric patterns of on-state pixels within the plurality of off-state pixels can advantageously improve the extinction ratio of device 200. In various embodiments, selectively switching a plurality off-state pixels to an on-state condition can improve the extinction ratio of device 200 by two (2) dB, four (4) dB, or more. In some cases, generating symmetric patterns of on-state pixels within mirror assembly 210b can advantageously improve the ripple along the floor of modulator 208.

In this example embodiment, optical device 200 operates to selectively drop at least one wavelength channel $\lambda_{DROP}$ from signal 212. In an alternative embodiment, off-state mirror assembly 210b operates to selectively add one or more wavelength channels $\lambda_{ADD}$ and to introduce the one or more wavelength channels $\lambda_{ADD}$ into output multiple wavelength optical signal 214 for communication through the optical network.

Figure 3A:
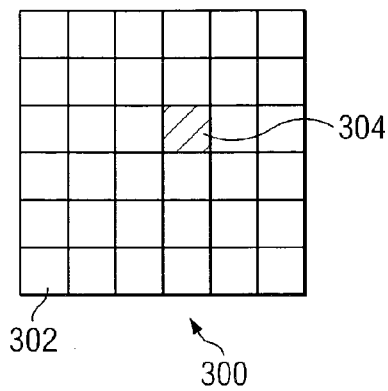
FIGS. 3a and 3b are block diagrams illustrating example pixel patterns capable of improving the extinction ratio of an optical device implementing a coherent light modulator.
Figure 3B:
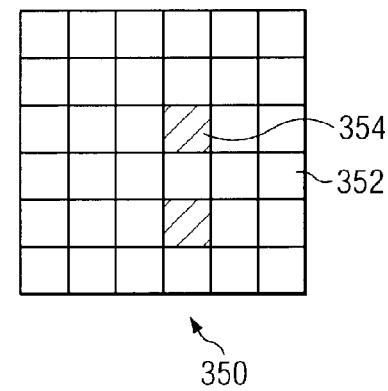

FIGS. 3a and 3b are block diagrams illustrating example pixel patterns capable of improving the extinction ratio of an optical device implementing a coherent light modulator. FIG. 3a is a block diagram of an off-state mirror assembly 300 illustrating one example pixel pattern capable of improving the extinction ratio of an optical device. The structure and function of mirror assembly 300 and the optical device can be substantially similar to off-state mirror assembly 110b and optical device 100 of FIG. 1, respectively. In this example, mirror assembly 300 comprises a plurality of off-state pixels 302 and an on-state pixel 304. Although this example depicts a single pixel pattern, any pixel pattern having any number of on-state pixels can be used without departing from the scope of the present disclosure.

In operation, off-state mirror assembly 300 receives a single optical wavelength channel $\lambda_{DROP}$. In this example, off-state pixels 302 operate to selectively remove wavelength channel $\lambda_{DROP}$ from a multiple wavelength optical signal received by the optical device and to transmit wavelength channel $\lambda_{DROP}$ along a desired diffraction order. In addition, in some cases, off-state pixels 302 can reflect a composite light phase along an undesired diffraction order that may enable at least some of the composite light phase to couple into an output fiber. This composite light phase reflected from off-state pixels 302 typically limits the extinction ratio of the optical device containing mirror assembly 300. To substantially counteract the effect of the composite light phase, mirror assembly 300 selectively modulates pixel 304 to an on-state condition.

In this particular example, on-state pixel 304 operates to reflect a light phase that is approximately opposite the composite light phase reflected from off-state pixels 302. The light phase reflected from the selectively switched on-state pixel 304 substantially counteracts the effects of the composite light phase and advantageously improves the extinction ratio of the optical device by at least two (2) dB.

In various embodiments, a system operator or designer can select the pixel pattern to achieve a desired extinction ratio of the optical device implementing mirror assembly 300. The pixel pattern for mirror assembly 300 can comprise a symmetric pattern, an asymmetric pattern, a single pattern, a dual pattern, or any other desired pixel pattern. In some cases, the system operator or designer can select the pixel pattern through an external interface coupled to the control circuitry of the coherent light modulator.

FIG. 3b is a block diagram of at least a portion of an off-state mirror assembly 350 illustrating one example of a dual pixel pattern capable of improving the extinction ratio of an optical device. The structure and function of mirror assembly 350 can be substantially similar to mirror assembly 300 of FIG. 3a. In this example, mirror assembly 350 comprises a plurality of off-state pixels 352 and a plurality of on-state pixels 354. Although this example depicts a dual pixel pattern each having two adjacent on-state pixels, any pixel pattern having any number of on-state pixels can be used without departing from the scope of the present disclosure.

In operation, off-state mirror assembly 350 receives a single optical wavelength channel $\lambda_{DROP}$. In this example, off-state pixels 352 operate to selectively remove wavelength channel $\lambda_{DROP}$ from a multiple wavelength optical signal received by, the optical device and to transmit wavelength channel $\lambda_{DROP}$ along a desired diffraction order. In addition, in some cases, off-state pixels 352 can reflect a composite light phase along an undesired diffraction order that may enable at least some of the composite light phase to couple into an output fiber. This composite light phase reflected from off-state pixels 352 typically limits the extinction ratio of the optical device containing mirror assembly 350. To substantially counteract the effect of the composite light phase, mirror assembly 350 selectively modulates pixels 354 to an on-state condition.

In this particular example, on-state pixels 354 operate to reflect a light phase that is approximately opposite the composite light phase reflected from off-state pixels 352. The light phase reflected from the selectively switched on-state pixels 354 substantially counteracts the effects of the composite light phase and advantageously improves the extinction ratio of the optical device by at least two (2) dB.

Figure 4A:
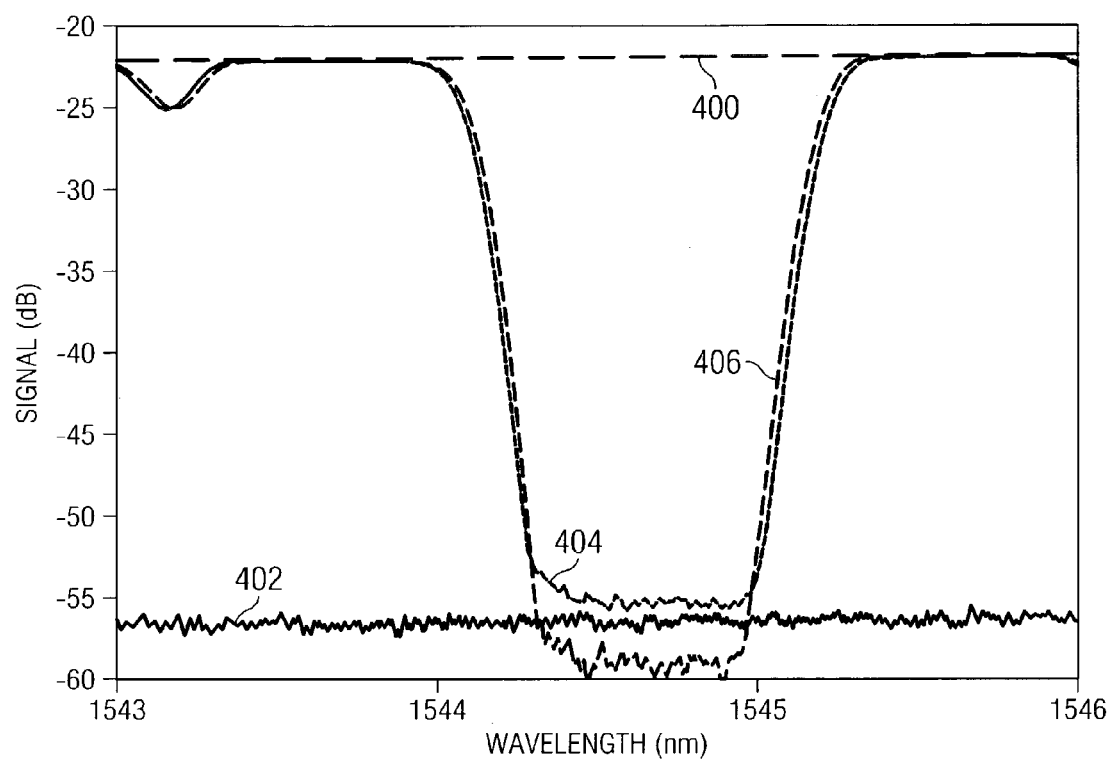
FIGS. 4a and 4b are graphs illustrating examples of improvements to an extinction ratio of an optical device by implementing desired pixel patterns.
Figure 4B:
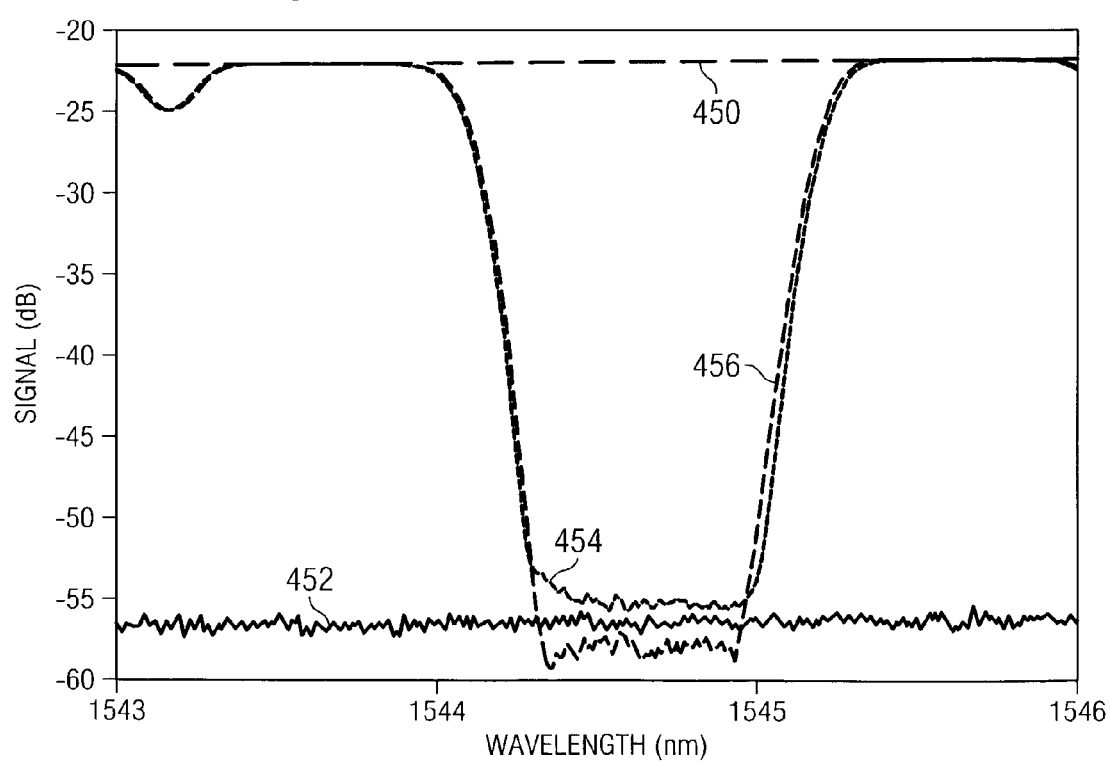

FIGS. 4a and 4b are graphs illustrating examples of improvements to an extinction ratio of an optical device by implementing desired pixel patterns. FIG. 4a is a graph showing the improvement to an extinction ratio of an optical device implementing a coherent light modulator having a pixel pattern comprising a single on-state pixel. The structure and function of the optical device and the coherent light modulator can be substantially similar to optical device 100 and coherent light modulator 108 of FIG. 1. In this example, the coherent light modulator comprises a plurality of mirror assemblies each comprising a plurality of micro-mirrors or pixels. The structure and function of the mirror assemblies can be substantially similar to either of mirror assemblies 110a or 110b of FIG. 1.

In this example, line 400 represents the output power of the coherent light modulator operating with all the mirror assemblies in an on-state condition. Line 402 represents the output power of the coherent light modulator operating with all the mirror assemblies in an off-state condition. In this example, line 404 represents the output power of the coherent light modulator operating with one of the plurality of mirror assemblies in an off-state condition. In other words, the coherent light modulator is capable of dropping at least one wavelength channel from the optical device. In this example, line 406 represents the output power of the at least one mirror assembly operating in the off-state condition and implementing a pixel pattern having at least one on-state pixel. The horizontal axis represents the wavelength channels capable of being communicated from or dropped by the coherent light modulator, while the vertical axis represents the signal power diffracted from the coherent light modulator.

This graph illustrates that an off-state mirror assembly implementing a pixel pattern having at least one on-state pixel can be used to improve the extinction ratio of an optical device. In addition, this graph shows that the extinction ratio can be improved by at least 2 dB and in some cases by at least 5 dB through the implementation of a desired pixel pattern.

FIG. 4b is a graph showing the improvement to an extinction ratio of an optical device implementing a coherent light modulator having a pixel pattern comprising a single on-state pixel. The structure and function of the optical device and the coherent light modulator can be substantially similar to optical device 100 and coherent light modulator 108 of FIG. 1. In this example, the coherent light modulator comprises a plurality of mirror assemblies each comprising a plurality of micro-mirrors or pixels. The structure and function of the mirror assemblies can be substantially similar to either of mirror assemblies 110a or 110b of FIG. 1.

In this example, line 450 represents the output power of the coherent light modulator operating with all the mirror assemblies in an on-state condition. Line 452 represents the output power of the coherent light modulator operating with all the mirror assemblies in an off-state condition. Line 454 represents the output power of the coherent light modulator operating with one of the plurality of mirror assemblies in an off-state condition. In other words, the coherent light modulator is capable of dropping at least one wavelength channel from the optical device. In this example, line 456 represents the output power of the at least one mirror assembly operating in the off-state condition and implementing a dual pixel pattern having at least two on-state pixels. The horizontal axis represents the wavelength channels capable of being communicated from or dropped by the coherent light modulator, while the vertical axis represents the signal power diffracted from the coherent light modulator.

This graph illustrates that an off-state mirror assembly implementing a dual pixel pattern having at least two on-state pixels can be used to improve the extinction ratio of an optical device. In addition, this graph shows that the extinction ratio can be improved by at least 2 dB and in some cases by at least 5 dB through the implementation of a desired pixel pattern.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method of operating a micromirror device, the method comprising:
   receiving a beam of light along an input path;
   providing a plurality of micromirrors on said input path, said micromirrors operable to deflect in either a first direction about an axis to a first deflected state, or to deflect in a second direction about said axis to a second deflected state, said first and second directions being opposite relative to a plane in which said plurality for micromirrors are formed, wherein micromirrors in said first deflected state reflect light along a first path, and micromirrors in said second deflected state reflect light along a second path;
   positioning a first group of micromirrors in said first state to direct a first portion of said beam of light along said first path;
   position a second group of micromirrors in said second state to direct a second portion of said beam of light along said second path;
   selecting at least one micromirror from said second group of micromirrors;
   positioning said selected at least one micromirror in said first state, such that said first portion is reduced.

2. The method of claim 1, further comprising reflecting a first light phase from the at least one of the plurality of micro-mirrors positioned in the on-state position that is substantially opposite a second light phase reflected from the at least a majority of the plurality of micromirrors positioned in the off-state position.

3. The method of claim 1, further comprising receiving at least one optical signal wavelength at the plurality of micromirrors associated with the mirror assembly.

4. The method of claim 3, further comprising dropping the at least one optical signal from the optical device.

5. The method of claim 3, further comprising receiving a multiple wavelength optical signal at the optical device, the multiple wavelength optical signal comprising the at least one optical signal wavelength received by the plurality of micro-mirrors.

6. The method of claim 5, further comprising adding at least one wavelength to a multiple wavelength optical signal communicated from the optical device.

7. A method of operating a micro electro-mechanical system (MEMS) device, the method comprising:
- receiving a beam of light along an input light path;
- spatially dispersing said beam of light by wavelength;
- providing a plurality of micro electromechanical switching elements on said dispersed path such that a band of wavelengths impinges a plurality of said elements, each element being operable in a first state to direct light along a first path, and in a second state to not direct light along said first path;
- placing a first group of said elements in said firststate to direct a first portion of said beam of light along said first path;
- placing a second group of elements in said second state;
- selecting at least one element from said second group of elements; and
- positioning said selected at least one element in said first state, such that said first portion is reduced.

8. The method of claim 7, wherein the MEMS device operates to drop at least one optical signal wavelength.

9. The method of claim 7, further comprising reflecting a first light phase from the at least one selected element that is substantially opposite a second light phase reflected from said first group of elements.

10. The method of claim 7, said receiving comprising receiving a multiple wavelength optical signal at the MEMS device, the multiple wavelength optical signal comprising at least one optical signal wavelength received by elements in a first region of said MIEMS device, including said first group of elements.

11. The method of claim 10, further comprising adding at least one wavelength to the multiple wavelength optical signal.

12. The method of claim 10, further comprising communicating at least some of the wavelengths of the multiple wavelength optical signal to an output optical fiber.

13. The method of claim 7, said providing a plurality of micro electromechanical switching elements comprising:
- providing a plurality of micromirrors, said micromirrors operable to deflect in either a first direction about an axis to a first deflected state, or to deflect in a second direction about said axis to a second deflected state, said first and second directions being opposite relative to a plane defined by said plurality of micromirrors, wherein micromirrors in said first deflected state reflect light along a first path, and micromirrors in said second deflected state reflect light along a second path.

14. A method of operating a micro electro-mechanical system (MEMS) device, the method comprising:
- receiving a beam of light along an input light path;
- spatially dispersing said beam of light by wavelength;
- providing a plurality of micro electromechanical switching elements on said dispersed path such that a band of wavelengths impinges a plurality of said elements, each element being operable in a first state to direct light along a first path, and in a second state to not direct light along said first path;
- placing a first group of said elements in said first state to direct a first portion of said beam of light along said first path, said light reflected by said first group of said elements having a first phase;
- placing a second group of elements in said second state;
- selecting at least one element from said second group of elements; and
- positioning said selected at least one element in said first state to reflect light having a second phase substantially opposite said first phase along said first path such that said first portion is reduced.

15. The method of claim 14, wherein the first phase and said second phase substantially counteract.

16. The method of claim 14, further comprising communicating at least part of said first portion to an output optical fiber.

* * * * *